Figure 1:
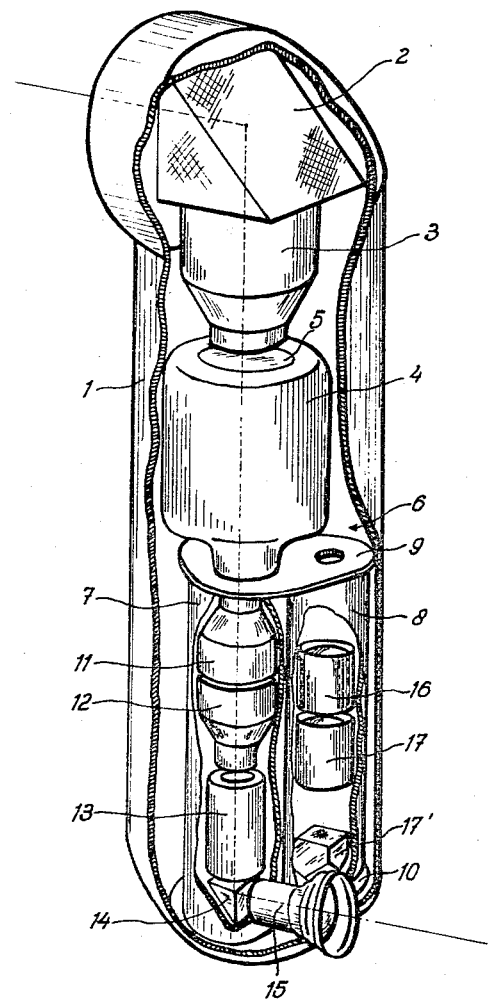

June 6, 1967 A. BOUWERS 3,324,300
NIGHT TELESCOPE USING A MOVABLE IMAGE AMPLIFIER TUBE
Filed Feb. 18, 1964 2 Sheets-Sheet 1

INVENTOR
ALBERT BOUWERS
BY
Dean, Fairbank & Hirsch
ATTORNEY

United States Patent Office 3,324,300
Patented June 6, 1967

3,324,300
NIGHT TELESCOPE USING A MOVABLE IMAGE AMPLIFIER TUBE
Albert Bouwers, The Hague, Netherlands, assignor to N.V. Optische Industrie "De Oude Delft," Delft, Netherlands
Filed Feb. 18, 1964, Ser. No. 345,660
Claims priority, application Netherlands, Feb. 27, 1963, 289,550
7 Claims. (Cl. 250—213)

The invention relates to a night telescope of the type comprising an electronic image amplifier tube, a front optical system which focuses an image of the terrain to be viewed on the photocathode of the image amplifier tube, and a rear optical system including an eye piece for viewing the resulting image on the anode screen of the image amplifying tube. Such telescopes are well-known. They utilize the ability of image amplifying tubes to convert by electron-optical amplification a low intensity optical image that is focused on the photocathode into an image of higher brightness displayed on the anode screen. The primary optical image can be formed either by radiation primarily from the visible wave length region of the electromagnetic spectrum or by rays from the near infrared region. In the first mentioned case preferably the available natural light is utilized whereas in the second case the terrain is usually irradiated by artificial light sources producing the desired wave lengths. For this reason, these two methods of night observation may be distinguished as "passive" and "active", respectively.

The invention relates particularly, though not exclusively, to a telescope for passive night observation, and has for its principal object to provide means whereby one and the same telescope permits optimal vision under widely divergent conditions with respect to the brightness of the scenes to be observed.

To that end the night telescope according to the invention is provided with a second image amplifying tube as well as a coupling optical system including a coupling objective of high luminosity to form an image of the anode screen of the first image amplifying tube upon the photocathode of the second. The second image amplifying tube and/or at least a part of the coupling optical system are locatable in at least two different positions. In one position, solely the first image amplifying tube is operative and its anode screen image can be viewed through the eye piece which preferably is stationary. In the other position, the second image amplifying tube is optically coupled with the tube and the anode screen image of the second image amplifying tube can be viewed through the same eye piece.

Night telescopes with two image amplifying tubes coupled in series are known in the art per se. Provided that a coupling optical system is used having sufficient luminosity, the brightness gain of such two-stage instruments is considerably greater than that of single-tube telescopes. They can be used at advantage in cases where lighting conditions are very poor, e.g. under a moonless night sky. However, they have an essential drawback in that the quality of the image is inevitably strongly deteriorated in the second stage amplifying. When operated under less bad light conditions, such as at full moon or in the twilight, the electron current in the second image amplifying tube may rise to values far higher than normal whereby additional undesirable effects may be caused which result in a further deterioration of image quality. Although such effects could be partly compensated for by stopping down the front optical system, this would involve structural complications. For these reasons telescopes with single-stage image amplifiers can not dispensed with and separate double- or multistage amplifiers are seldom used in practice.

If compared to the prior art two-stage amplifier telescopes, the invention provides the special advantage that the additional luminosity gain obtainable by means of the second stage is actually utilized only in cases where the first stage reaches an insufficient brightness level, whereas in all other cases full advantage is taken from the better acuity of a single tube. These valuable properties are achieved in a single telescope whose dimensions need hardly exceed those of the prior art two-stage telescopes, which fact in some applications, such as in armoured vehicles, where space is very limited may be of predominant importance.

Figure 2:
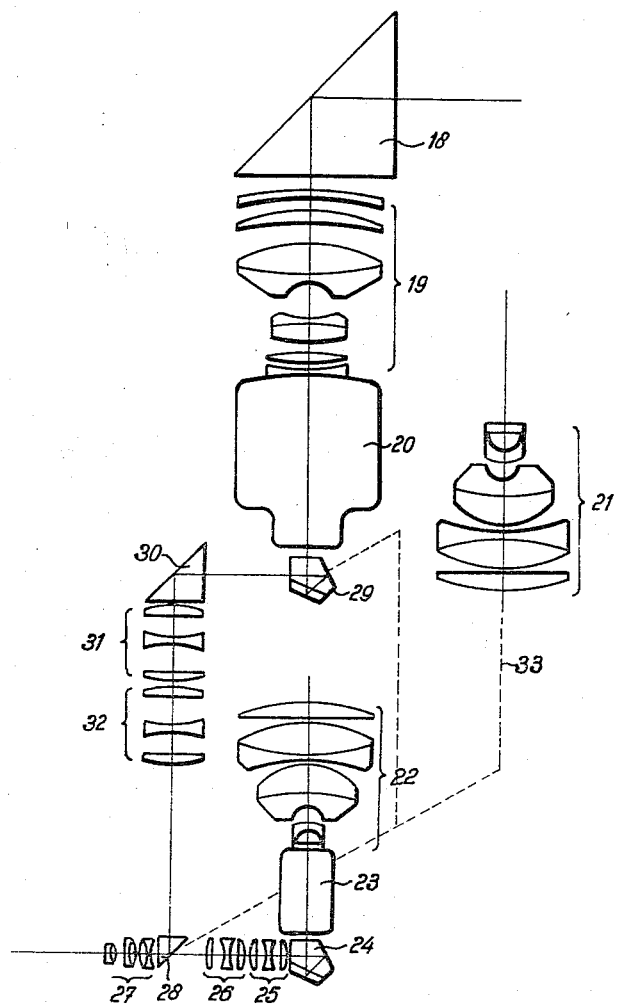

Two embodiments of the invention will be discussed in detail hereinafter, reference being had to the drawings in which:

FIG. 1 shows a first telescope in accordance with the invention in perspective view, the instrument casing being broken away in part to show the interior; and FIG. 2 is a diagrammatic sectional view of a second telescope, only those parts being shown which take part in the imagery.

In the telescope according to FIG. 1 the rear optical system of the first image amplifying tube comprises, in addition to the eye piece, an objective which forms an image of the anode screen of the first image amplifying tube in the focal plane of the eye piece. The objective is mounted in a sidewardly pivotable or slidable member which carries also the second image amplifying tube and the coupling objective in front thereof, the arrangement being such that with the second image amplifying tube in operative position, the anode screen thereof lies in the focal plane of the eye piece.

The telescope of FIG. 2, on the contrary, is characterized in that the first and second image amplifying tubes are permanently disposed one behind the other in coaxial relation and include the coupling objective of which at least a part is movable between them. The rear optical system of the first image amplifying tube comprises, in addition to the eye piece, an objective which is fixedly disposed next to the second image amplifying tube with its axis parallel to the axes of the tubes. Said telescope further comprises four reflecting elements adapted to bend the path of light rays through about 90°, two of these, i.e. one disposed on the object side of the objective in the rear optical system of the first image amplifying tube and the other disposed on the anode side of the second image amplifying tube, being fixed, and the remaining two, i.e. one of the anode side of the first image amplifying tube and the other in front of the eye piece, being displaceable together with the movable part of the coupling objective. In addition, a further objective is disposed between the fixed reflecting element on the anode side of the second image amplifying tube and the displaceable reflecting element in front of the eye piece, said further objective forming an image of the anode screen of the second image amplifying tube in the focal plane of the eye piece when the latter tube is in operation.

Both telescopes shown are of the periscopic type and intended for use in vehicles. It is desirable therefore that the eye pieces have a fixed position in space in order to avoid that the observer must change the attitude of body and head each time he changes over from one-stage to two-stage viewing. The telescopes shown satisfy this condition. It will be evident, furthermore, that any well-known type of binocular viewing means could be substituted for the monocular rear optics illustrated.

Referring to FIG. 1, in the telescope casing 1 there are housed an entrance prism 2, an objective 3 of high relative aperture, and a first image amplifying tube 4. On the photocathode 5 of tube 4 an image of the scene in front of the telescope is formed. The photocathode emits eletrons in a spatial density pattern corresponding to the light intensity pattern of the optical image projected thereon The electrons are accelerated by an electrostatic field in the tube and focused on the fluorescent anode screen placed in the lower part of the tube (not visible in the drawing) so as to produce an image of increased brightness thereon. Particulars in connection with the electron-optical focusing lenses used in the tube do not form part of the present invention and are therefore not discussed in greater detail here. The parts 2, 3 and 4 have a fixed position in the telescope casing. Electrical sources of high potentials for the image tube and of the energizing current of the magnetic focusing coils, if any, are preferably housed in the casing, but are not shown for simplicity's sake.

In the lower portion of the telescope casing a switching member 6 is shown which comprises two end plates 9 and 10 interconnected by vertical tubes 7 and 8. Member 6 is pivotable about a vertical axis (invisible in the drawing) within the casing 1 in such a manner that the axis of each of the tubes 7 and 8 can be aligned at will with the axis of the image amplifying tube 4. In tube 7 there are mounted, in mutual alignment, a coupling objective of high luminosity consisting of two equal parts 11, 12, a second image amplifying tube 13 and a 45°-prism 14. Both the coupling objective 11, 12 and the tube 13 work at a magnification equal to unity so that the final image appearing on the anode screen of tube 13 has dimensions equal to those of the anode screen image of tube 4. The 45°-prism 14 bends the path of light rays between the anode screen of the tube 13 and the fixedly attached eye piece 15 through 90°. Since the telescope with both image amplifying tubes in use contains four image inverting elements, i.e. the two tubes and the objectives 3 and 11, 12, respectively, an erect image is viewed through the eye piece 15.

The other tube 8 houses an objective consisting of the two halves 16, 17 and which is, like the objective 11, 12, used at unit-magnification. This objective has longer focal length, however, such that the image of the anode screen of tube 4 lies in the focal plane of the eye piece 15. Since in the case of tube 8 no image inversion by a second amplifying tube occurs the required bending of the light path in the direction of the eye piece is now secured by means of an image inverting prism, i.e. the pentagonprism with roof angle 17.

The change-over from tube 7 to tube 8 may be effected very quickly e.g. by means of a knob (not visible in the drawing) secured to the rotating shaft of the switching member 6. This shaft is passed through a suitable opening in the bottom of the telescope casing.

In both cases the telescope of FIG. 1 has the same over-all magnification. This magnification is determined by the focal length of the objective 3, the magnification of the image amplifying tube 4 and the focal length of the eye piece 15. It is observed in this connection that it will be generally desirable to use a certain optical demagnification in the tube 4 since the brightness gain is proportional to the square of the demagnification factor. The over-all magnification of the telescope could be e.g. 3 times but may be varied within wide limits dependent on the field of view it is desired to cover. The objectives 3 and 11, 12 will of course be selected for having a large relative aperture such as $f/1$ and $f/0.75$ respectively. The objective halves 16, 17, on the contrary, may have a relative aperture adapted to that of the eye piece 15 and may be e.g. $f/4$.

The periscope of FIG. 2 is similar to that of FIG. 1 as far as the parts up to and including the first image amplifying tube is concerned. Thus, it has an entrance prism 18, a wide-aperture objective 19 and an image amplifying tube 20 which are mounted in optical alignment in the telescope casing (not shown). However, whereas in FIG. 1 the second image amplifier tube was movable, it is now fixedly aligned with the first tube 20 and between the two tubes 20 and 23 the symmetrical coupling objective consisting of the halves 21, 22 is so disposed as to achieve unit magnification. The objective half 22 is permanently mounted, the other half 21, on the contrary, is movable sidewardly and is shown in its inoperative position. Under the anode screen of the tube 23 a pentagonprism 24 with roof-angle is fixedly mounted which provides an additional image inversion and bends the path of rays in the direction of the objective halves 25, 26 of the rear optical system belonging to the amplifying tube 23. The objective 25, 26 forms an image at unit magnification of the anode screen of tube 23 in the focal plane of eye piece 27. In this arrangement the number of image inverting elements is six so that an erect image is observed.

For direct observation of the anode image of the first image amplifying tube 20 an objective consisting of equal halves 31 and 32 is fixedly mounted with its axis parallel to the image tube axes. On top of this objective a 45°-prism 30 is likewise fixedly disposed. Together with the objective part 21 two prisms are movable, i.e. a pentagonprism 29 with roof-angle which in operative position is under the anode screen of the first time image amplifying tube 20, and a 45°-prism 28 which in operative position is located in front of the eye piece 27 such that the image formed by the objective 31, 32 is made to lie in the focal plane of the eye piece. The movable parts 21, 28 and 29 are preferably mounted on a common carriage which is slidably supported in the casing as indicated diagrammatically in the drawing by the system of dotted lines 33. Thus, when the half 24 of the coupling objective is removed from the path of light rays, prisms 28 and 29 are switched in simultaneously. The anode image of tube 20 can then be viewed through the optical system consisting of the pentagonprism 29, prism 30, objective 31, 32, prism 28 and eye piece 27. In this position, the telescope has four image inverting elements so that likewise an erect image is seen.

Similar remarks as made in connection with FIG. 1 may be made with respect to the over-all magnification of the telescope and the selection of the constituting parts. It will be appreciated that the instrument of FIG. 2 has the advantage of a fixed mounting of the image amplifying tube 23, which may be important in view of the electrical connections with the tube.

Though the telescopes shown and described are intended primarily for use in passive night observation, it will be evident to those skilled in the art that the invention may be successfully applied to infrared night viewing as well. In that application the advantage is achieved that by switching the second image amplifying tube to operation the range of vision of the telescope can be increased largely in cases where the observer feels a need thereto.

I claim:

1. A night telescope comprising an electronic image amplifier tube, a front optical system which focuses an image of the terrain to be viewed on the photocathode of the image amplifying tube, a rear optical system including an eye piece for viewing the resulting image on the anode screen of the image amplifying tube, a second image amplifying tube, coupling optical system means, at least a portion of which is movable between two positions to permit viewing of the anode screen of the first image amplifying tube through said eye piece in the first position and to permit viewing of the anode screen of the second image amplifying tube through said eye piece in the second position and means optically to couple said first and second image amplifying tubes when in said second position.

2. A telescope according to claim 1, in which the rear optical system of the first image amplifying tube comprises, in addition to the eye piece, an objective which forms an image of the anode screen of the first image amplifying tube in the focal plane of the eye piece, said objective being mounted in a movable member which also carries the second image amplifying tube and the portion of the coupling objective system means in front thereof, the arrangement being such that with the second image amplifying tube in operative position the anode screen thereof lies in the focal plane of the eye piece.

3. A telescope according to claim 1, in which the first and second image amplifying tubes are permanently disposed one behind the other in coaxial relation and include the coupling objective system means at least a portion of which is movable between them, the rear optical system of the first image amplifying tube comprising, in addition to the eye piece, an objective which is fixedly disposed adjacent the second image amplifying tube with its axis parallel to the axes of the tubes, said telescope further comprising four reflecting elements adapted to bend the path of light rays through about 90°, two of the reflecting elements having one element disposed on the object side of the objective in the rear optical system of the first image amplifying tube and the other element being disposed on the anode side of the second image amplifying tube and being fixed, and the remaining two reflecting elements having one on the anode side of the first image amplifying tube and the other in front of the eye piece and being displaceable together with the movable portion of the coupling objective system means, a further objective being disposed between the fixed reflecting element on the anode side of the second image amplifying tube and the displaceable reflecting element in front of the eye piece, said further objective forming an image of the anode screen of the second image amplifying tube in the focal plane of the eye piece when the latter tube is in operation.

4. A telescope according to claim 1, in which the telescope in both said positions of the coupling optical system means has the same over-all magnification.

5. A telescope according to claim 4, in which both the coupling objective system means and the second image amplifying tube have a magnification substantially equal to untiy.

6. A night telescope comprising a first image amplifier tube having a first photocathode and a first anode screen, a front optical system including an objective for focusing an image of a scene to be viewed on said first photocathode, a viewing system for viewing an image on said first anode screen which comprises an objective forming an intermediate image and an eye piece for viewing said intermediate image, a second image amplifier tube having a second photocathode and a second anode screen, and being movable between an operative and an inoperative position, a coupling objective in optical alignment with said second image amplifier tube and being movable therewith, such that in said operative position said coupling objective is in optical alignment with said first image amplifier tube and projects an image of said first anode screen onto said second photocathode, said objective in said viewing system being movable with said second image amplifier tube so as to be in optical alignment with said first image amplifier tube when said second image amplifier tube is in its inoperative position, said intermediate image then being in the same plane where said second anode screen lies when said second image amplifier tube is in its operative position, said eye piece being stationary and having its focal plane coinciding with the plane of said intermediate image.

7. A night telescope comprising a first image amplifier tube having a first photocathode and a first anode screen, a front optical system including an objective for focusing an image of a screen to be viewed on said first photocathode, a coupling objective in optical alignment with said first image amplifier tube, a second image amplifier tube having a second photocathode and a second anode screen, and being in optical alignment with said coupling objective so as to receive from said coupling objective an image of said first anode screen on said second photocathode, a viewing system including a first intermediate objective and a stationary eye piece for viewing said second anode screen, said first intermediate objective being disposed to form an image of said second anode screen in the focal plane of said eye piece, a second intermediate objective having its optical axis parallel to the axis of said coupling objective and in spaced relation thereto, and four reflecting elements so disposed as to bend the optical path through substantially 90°, at least a portion of said coupling objective nearest to said first image amplifying tube being movable into an inoperative position outside the optical path, a first one of said reflecting elements being movable with said portion of said coupling objective so as to become aligned with said second image amplifier tube when said portion of said coupling objective is in its inoperative position, a second one of said reflecting elements being stationary and so disposed as to transmit light received from said first reflecting element into said second intermediate objective, a third one of said reflecting elements being likewise movable with said portion of said coupling objective so as to transmit light received from said second intermediate objective into said eye piece when said portion of said coupling objective is in its inoperative position, the fourth one of said reflecting elements being fixedly disposed in alignment with said second image amplifier tube so as to transmit light received from said second anode screen to said first intermediate objective and thence to said eye piece.

References Cited

UNITED STATES PATENTS

| | | | |
|---|---|---|---|
| 2,258,436 | 10/1941 | Von Ardenne | 250—213 |
| 2,946,255 | 7/1960 | Bolay | 250—213 X |
| 2,970,220 | 1/1961 | Bouwers | 250—213 |
| 3,124,682 | 3/1964 | Kojima et al. | 250—213 |
| 3,155,832 | 11/1964 | Bouwers | 88—72 |

WALTER STOLWEIN, *Primary Examiner.*